United States Patent [19]

Clegg

[11] Patent Number: 4,603,949

[45] Date of Patent: Aug. 5, 1986

[54] CONICAL BEAM CONCENTRATOR

[76] Inventor: John E. Clegg, 2320 Keystone Dr., Orlando, Fla. 32806

[21] Appl. No.: 657,093

[22] Filed: Oct. 2, 1984

[51] Int. Cl.⁴ ............... G02B 13/18; G02B 17/08
[52] U.S. Cl. ............................... 350/432; 350/443
[58] Field of Search .......................... 350/432, 443

[56] References Cited

U.S. PATENT DOCUMENTS

| | | | |
|---|---|---|---|
| 2,881,654 | 4/1959 | Toffolo | 350/432 |
| 2,882,784 | 4/1959 | Toffolo | 350/432 |
| 4,277,148 | 7/1981 | Clegg | 350/432 |
| 4,325,612 | 4/1982 | Clegg | 350/432 |
| 4,333,713 | 6/1982 | Clegg | 350/432 |

*Primary Examiner*—John K. Corbin
*Assistant Examiner*—Rebecca D. Gass

[57] ABSTRACT

An upper component lens which receives a circular whole beam and emits a convergent-divergent conical beam, and a lower component lens which receives the convergent-divergent beam and emits a concentrated whole beam.

1 Claim, 2 Drawing Figures

CONICAL BEAM CONCENTRATOR

BACKGROUND

The code designation of the beam concentrator is LRLT-RT:C (R—refracting section of a component lens, T—transmitting section of a component lens, L—reflecting section of a component lens, and C—concentrating stage lens).

Prior art includes the Conical Beam Concentrator, U.S. Pat. No. 4,333,713, June 8, 1982, by this inventor. This concentrator has an upper component lens which is identical to the upper component lens of the subject disclosure.

SUMMARY

A single stage lens of the conical beam concentrator cannot be used as a magnifying lens because it produces a reversed image. An image reversed an even number of times is a true image, however, and this means that two, four or six stage lenses can be stacked vertically in series to produce multiple magnification of images.

DRAWINGS

DESCRIPTION

Figure 1:
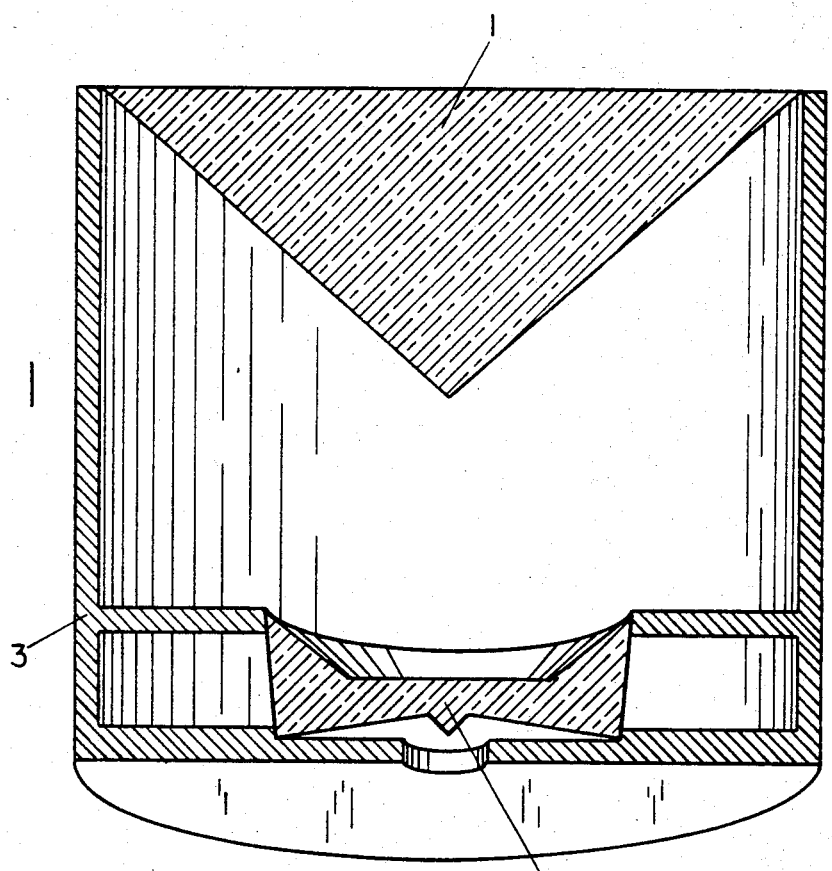
FIG. 1 is an elevation of the conical beam concentrator with the lenses shown in section.

FIG. 1 shows the conical beam concentrator LRLT-RT:C comprising annular upper component lens RT 1 and annular lower component lens LRLT 2 mounted in cylindrical casing 3.

Figure 2:
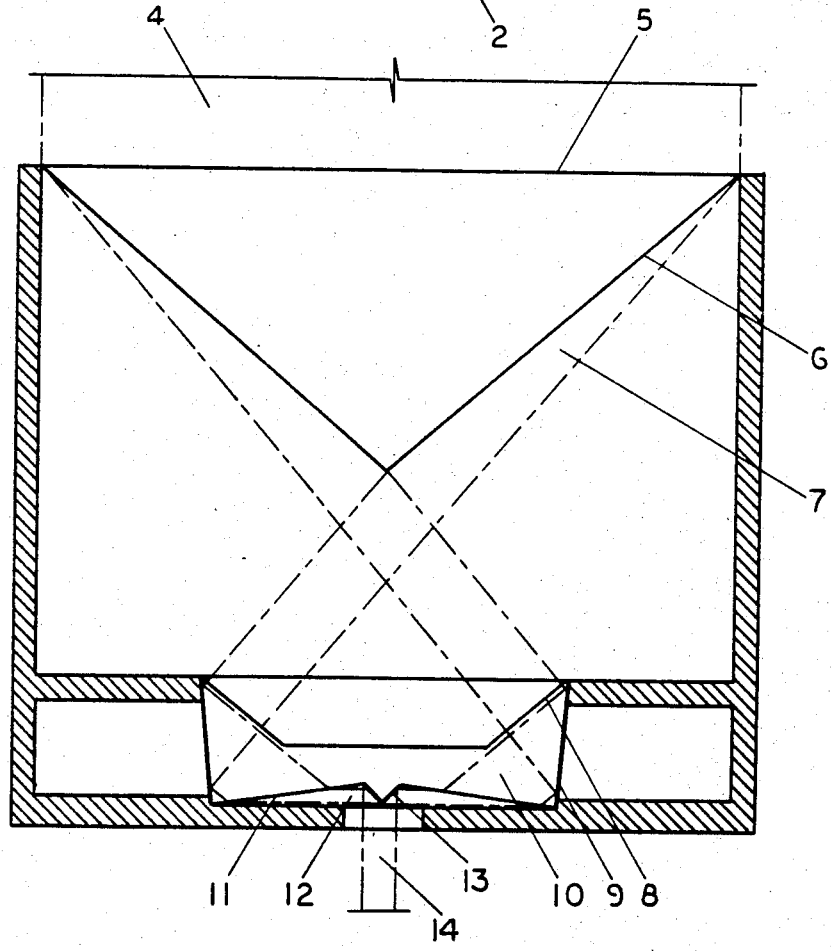
FIG. 2 is an elevation of the beam concentrator with a ray diagram.

FIG. 2 shows the beam concentrator with a ray diagram. Circular whole incipient beam 4 is transmitted by planar section 5 and refracted by convex conical section 6, forming convergent-divergent beam 7.

Beam 7 is transmitted by concave conical section 8 and reflected by concave conical reflective section 9, forming convergent conical beam 10.

Beam 10 is refracted by concave conical section 11, forming convergent lateral beam 12 in the horizontal plane.

Beam 12 is reflected downward by convex conical reflective section 13, forming circular whole concentrated beam 14 which is emitted parallel to the vertical optic axis of the concentrator.

I claim:

1. A conical beam concentrator LRLT-RT:C comprising;

an upper component lens RT having a planar section which receives and transmits into said upper component lens a circular whole incipient beam, and having a convex conical section which refracts and emits from said upper component lens said circular whole incipient beam, forming a convergent-divergent conical concentrated beam;

a lower component lens LRLT mounted below said upper component lens and having a concave conical section which receives and transmits into said lower component lens said convergent-divergent conical concentrated beam, having a concave conical reflective section which reflects said convergent-divergent conical concentrated beam, forming a convergent conical beam, having a concave conical section which refracts and emits from said lower component lens said convergent conical beam, forming a convergent lateral beam in a horizontal plane, and having a convex conical reflective section which reflects said convergent lateral beam, forming a circular whole concentrated beam which is emitted parallel to the vertical optic axis of the lenses; and a cylindrical casing serving as mounting means and aligning means of said upper component lens and of said lower component lens.

* * * * *